(12) United States Patent
Piirainen

(10) Patent No.: US 7,561,643 B1
(45) Date of Patent: *Jul. 14, 2009

(54) DC OFFSET CORRECTION IN MOBILE COMMUNICATION SYSTEM

(75) Inventor: Olli Piirainen, Oulu (FI)

(73) Assignee: Nokia Corporation, Espoo (FI)

( * ) Notice: Subject to any disclaimer, the term of this patent is extended or adjusted under 35 U.S.C. 154(b) by 0 days.

This patent is subject to a terminal disclaimer.

(21) Appl. No.: 10/111,533

(22) PCT Filed: Oct. 27, 1999

(86) PCT No.: PCT/EP99/08310
§ 371 (c)(1),
(2), (4) Date: Aug. 29, 2002

(87) PCT Pub. No.: WO01/31867
PCT Pub. Date: May 3, 2001

(51) Int. Cl.
*H03D 1/04* (2006.01)
*H03D 1/06* (2006.01)

(52) U.S. Cl. ............... 375/346; 375/316; 375/317; 375/319; 375/324; 375/341; 375/342

(58) Field of Classification Search ............... 375/346, 375/267, 347, 231, 232, 229, 350, 285, 348, 375/263, 316–319, 340, 341–342, 147, 324; 455/132, 137, 447, 502, 450, 452, 310, 311, 455/296; 370/337, 345, 350, 442; 329/320, 329/349

See application file for complete search history.

(56) References Cited

U.S. PATENT DOCUMENTS

| | | | |
|---|---|---|---|
| 5,034,962 A * | 7/1991 | Yamamoto et al. ........ | 375/222 |
| 5,886,748 A | 3/1999 | Lee ....................... | 348/614 |
| 6,337,855 B1 * | 1/2002 | Malkamaki ............... | 370/347 |
| 6,370,205 B1 * | 4/2002 | Lindoff et al. ............ | 375/319 |
| 6,438,115 B1 * | 8/2002 | Mazur et al. .............. | 370/330 |
| 6,449,320 B1 * | 9/2002 | Lindoff .................... | 375/319 |

(Continued)

FOREIGN PATENT DOCUMENTS

DE 19606102 * 2/1996

(Continued)

OTHER PUBLICATIONS

"Overview of the Global System for Mobile Communications" John Scourias University of Waterllo, 1995.*

*Primary Examiner*—Mohammad H Ghayour
*Assistant Examiner*—Sophia Vlahos
(74) *Attorney, Agent, or Firm*—Harrington & Smith, PC

(57) ABSTRACT

A method of simultaneously determining a DC offset and a channel impulse response from a received signal in a mobile communication system. The received signal Y comprising a set of training sequence bits that have been modulated prior to transmission. The modulated signals experience a certain phase shift and are rotated by a certain angle. The received signal may also comprise a DC offset component ADC that needs to be removed. By manipulation of the received signal samples with the knowledge of the original training sequence TRS and method of modulation used, it is possible to simultaneously estimate the communication channel's impulse response H and the DC offset ADC by finding the Least Square solution to a linear equation, such that the energy of the noise term introduced into the communication channel may be kept to a minimum.

14 Claims, 4 Drawing Sheets

U.S. PATENT DOCUMENTS

| | | | |
|---|---|---|---|
| 6,463,107 B1 * | 10/2002 | Lindoff et al. | 375/343 |
| 6,504,884 B1 * | 1/2003 | Zvonar | 375/346 |
| 6,567,480 B1 * | 5/2003 | Brardjanian et al. | 375/331 |
| 6,628,706 B1 * | 9/2003 | Lindoff | 375/231 |
| 6,717,995 B2 * | 4/2004 | Zvonar | 375/340 |
| 7,317,767 B2 * | 1/2008 | Happonen et al. | 375/319 |

FOREIGN PATENT DOCUMENTS

| | | | |
|---|---|---|---|
| DE | 19606102 A1 | | 8/1997 |
| DE | 19606102 A1 | * | 8/1997 |
| WO | WO 98/25351 | * | 6/1998 |

* cited by examiner

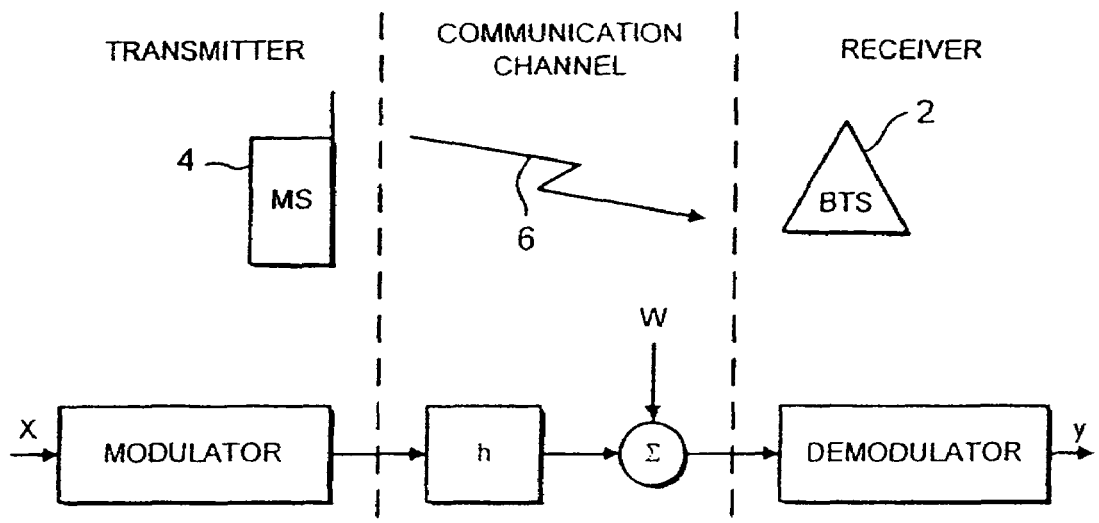
FIG. 1
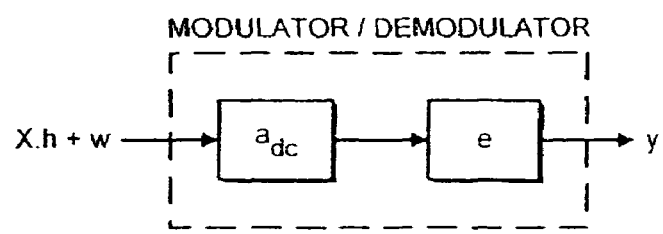
FIG. 2
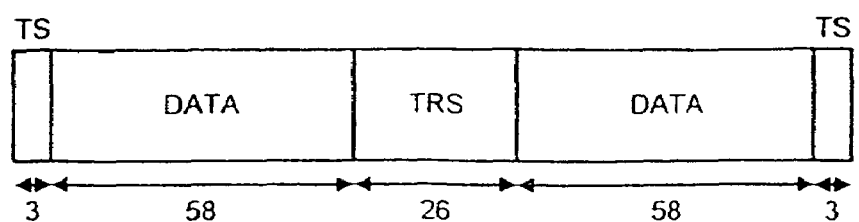
-- PRIOR ART --  FIG. 3

$$x = \begin{bmatrix} x_{11} & x_{12} & \cdot & \cdot & \cdot & x_{1m} \\ x_{21} & \cdot & \cdot & \cdot & \cdot & x_{2m} \\ \cdot & \cdot & \cdot & \cdot & \cdot & \cdot \\ \cdot & \cdot & \cdot & \cdot & \cdot & \cdot \\ \cdot & \cdot & \cdot & \cdot & \cdot & \cdot \\ \cdot & \cdot & \cdot & \cdot & \cdot & \cdot \\ \cdot & \cdot & \cdot & \cdot & \cdot & \cdot \\ x_{n1} & \cdot & \cdot & \cdot & \cdot & x_{nm} \end{bmatrix}$$

m COLUMNS, n ROWS $$x_e = \begin{bmatrix} x_{11} & x_{12} & \cdot & \cdot & \cdot & x_{1m} & e_{1(m+1)} \\ x_{21} & \cdot & \cdot & \cdot & \cdot & \cdot & e_{2(m+1)} \\ \cdot & \cdot & \cdot & \cdot & \cdot & \cdot & \cdot \\ \cdot & \cdot & \cdot & \cdot & \cdot & \cdot & \cdot \\ \cdot & \cdot & \cdot & \cdot & \cdot & \cdot & \cdot \\ \cdot & \cdot & \cdot & \cdot & \cdot & \cdot & \cdot \\ \cdot & \cdot & \cdot & \cdot & \cdot & \cdot & \cdot \\ x_{n1} & \cdot & \cdot & \cdot & \cdot & x_{nm} & e_{n(m+1)} \end{bmatrix}$$

m+1 COLUMNS, n ROWS

FIG. 4a $$h = \begin{bmatrix} h_1 \\ h_2 \\ \cdot \\ \cdot \\ \cdot \\ h_m \end{bmatrix} \qquad h_e = \begin{bmatrix} h_1 \\ h_2 \\ \cdot \\ \cdot \\ \cdot \\ h_m \\ a_{dc} \end{bmatrix}$$

m ROWS, m+1 ROWS

FIG. 4b

DC OFFSET CORRECTION IN MOBILE COMMUNICATION SYSTEM

PRIORITY CLAIM

This is a national stage of PCT application No. PCT/EP99/08310, filed on Oct. 27, 1999. Priority is claimed on that application.

FIELD OF THE INVENTION

The present invention relates particularly to DC offset correction in a mobile communication system.

BACKGROUND OF THE INVENTION

In a mobile communication system, signals are transmitted from mobile stations to a base station. A digital signal is prepared for transmission by the mobile station by subjecting it to a modulation technique and using the resulting signal to modulate a carrier wave at a certain frequency. In transmission of the signal from a mobile station to the base station, it may be subject to a number of different effects, depending on the environment through which the signal passes. That environment can vary considerably, depending, amongst other things, on the distance between the mobile station and the base station, and the interference caused by buildings and other structures in the area. It is quite common for a signal received from a mobile station at the base station to comprise a number of different multi-path effects and also to be subject to noise. Processing techniques at the receiver in the base station are known to resolve the effects of the environment through which the signal passes (communication channel) and also to take into account the effects of noise. The first step at the receiver is to sample the incoming signal to take a number of digital samples from the incoming analogue signal, normally sampled at the expected bit rate of the transmitted signal. This can give rise to a DC offset component which, if not removed, could corrupt the received signal samples such that the subsequent processing would be affected. In particular, the digital signal samples may be processed by an equaliser to compensate for the effects of the channel, and the known equalisers do not assume that a DC offset will be present. There are other sources that may introduce a DC offset and the magnitude of the DC offset may vary. It is an aim of the present invention to obtain a reliable estimate of the offset magnitude that needs to be removed from the signal, without degrading the performance too much in the case that in fact no DC offset has been introduced.

In current base stations, a possible DC component is removed from the received signal by digital signal processing means. This is performed by removing the mean signal level from the real and imaginary component separately. Thus, the received signal y is considered to comprise both a real component and an imaginary component which are handled separately. A mean value (Ey) can be calculated over a whole burst to improve reliability. However, the transmitted data itself can cause the average value to have a false mean value, even in the case where there is no actual DC offset. This clearly degrades the performance of the subsequent digital signal processing.

SUMMARY OF THE INVENTION

According to one aspect of the present invention there is provided a method of simultaneously determining a DC offset ($a_{dc}$) and a channel impulse response (h) for a signal received from a first station by a second station via a communication channel in a mobile communication system, the signal comprising digital data and a set of training sequence bits modulated prior to transmission, the method comprising: generating a set of reference signal samples representing the training sequence bits and a set of rotation elements depending on the modulation applied to the digital data prior to transmission; receiving and sampling the signal to produce a plurality of received signal samples from the training sequence portion of the signal, the received signal samples possibly including a DC offset; and manipulating the received signal samples with the sets of received signal samples and rotation elements in such a way as to simultaneously estimate the DC offset ($a_{dc}$) and the channel impulse response (h) by minimising the function $F=|y-X \cdot h - e \cdot a_{dc}|^2$, where y represents the received signal samples, X represents the training sequence samples and e represents the set of rotation elements.

According to another aspect of the invention there is provided a method of correcting for a DC offset in a signal received from a first station by a second station via a communication channel in a mobile communication system, the signal comprising digital data and a set of training sequence bits modulated prior to transmission, the method comprising: receiving and sampling the signal to produce a plurality of received signal samples from the training sequence portion of the signal, the received signal samples possibly including a DC offset; manipulating the received signal samples with a set of reference signal samples representing the training sequence bits and a set of rotation elements depending on the modulation applied to the digital data prior to transmission to simultaneously estimate the DC offset ($a_{dc}$) and the channel impulse response (h) by minimising the function $F=|y-X \cdot h - e \cdot a_{dc}|^2$, where y represents the received signal samples, X represents the training sequence samples and e represents the set of rotation elements; and correcting the set of received signal samples in the digital data portion of the signal by removing the thus estimated DC offset from the received signal samples.

According to a further aspect of the invention there is provided a system for simultaneously determining a DC offset and a channel impulse response in a signal received from a first station by a second station via a communication channel in a mobile communication system, the signal comprising digital data and a set of training sequence bits modulated prior to transmission, the method comprising: circuitry for receiving and sampling the signal to produce a plurality of received signal samples from the training sequence portion of the signal, the received signal samples possibly including a DC offset; a memory holding a set of reference signal samples representing the training sequence bits and a set of rotation elements depending on the modulation applied to the digital data prior to transmission; an extended channel impulse response calculation unit for manipulating the received signal samples with the reference signal samples and the set of rotation elements in such a way as to simultaneously estimate the DC offset ($a_{dc}$) and the channel impulse response (h) by minimising the function $F=|y-X \cdot h - e \cdot a_{dc}|^2$, where y represents the received signal samples, X represents the training sequence samples and e represents the set of rotation elements; and means for extracting the DC offset from the simultaneous estimate performed by the extended channel impulse response calculation unit.

A mathematically convenient way of manipulating the samples is to organise the received signal samples and the rotation elements as an extended training sequence matrix with m+1 columns, where m columns contain the reference signal samples and the m+1$^{th}$ column contains the rotation elements.

The precise manipulation of the received signal samples with the extended reference matrix is discussed in more detail in the following. The inventor has found that by using this extended matrix in a mathematical manipulation, which minimises the noise function w, an estimate can be made simultaneously of the channel impulse response and the DC offset, which can then be removed. For a matrix manipulation, an extended channel impulse vector is generated comprising m channel impulse response elements and a further element $a_{dc}$.

The invention is particularly but not exclusively applicable to a TDMA communication system, where each signal comprises a transmission burst.

The system described herein also includes an equaliser which uses the channel impulse elements extracted from the extended channel impulse vector to account for effects of the communication channel. It will readily be appreciated that after equalisation the data is subject to a number of subsequent processing steps in order to extract the original data in the burst. These are not described herein because they are known to a person skilled in the art and do not form part of the present invention.

Other objects and features of the present invention will become apparent from the following detailed description considered in conjunction with the accompanying drawings. It is to be understood, however, that the drawings are intended solely for purposes of illustration and not as a definition of the limits of the invention, for which reference should be made to the appended claims.

BRIEF DESCRIPTION OF THE DRAWINGS

For a better understanding of the present invention and to show how the same may be carried into effect, reference will now be made by way of example to the accompanying drawings in which:

FIG. 1 is a diagram of a model of the transmission system;

FIG. 2 is a further diagram of a model of the system;

FIG. 3 is a diagram that represents the standard structure of a signal burst in a mobile communication system;

FIGS. 4*a* and 4*b* are diagrams that show the construction of the extended training sequence matrix and the extended impulse response vector, respectively;

DETAILED DESCRIPTION OF THE PRESENTLY PREFERRED EMBODIMENTS

Figure 5:
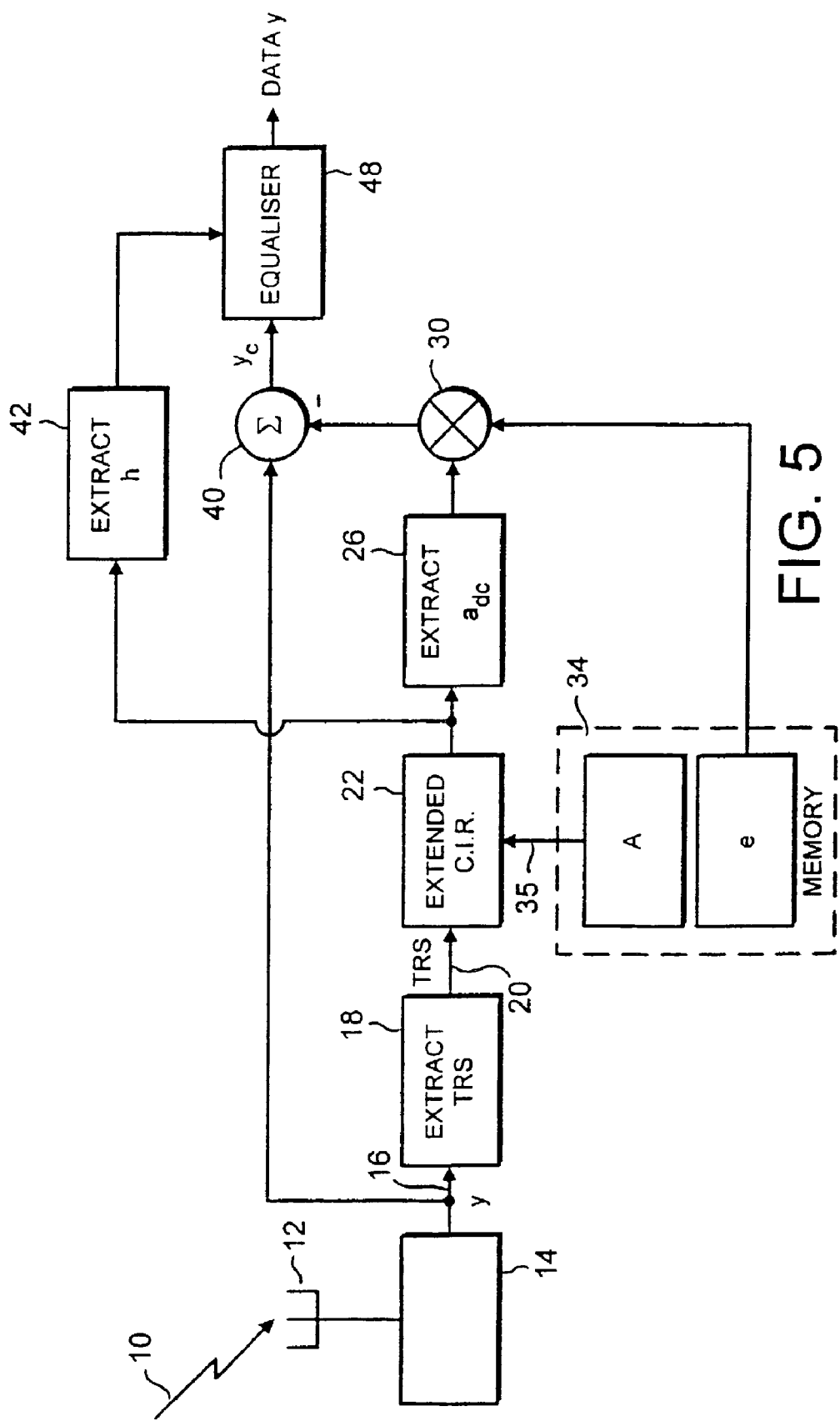
FIG. 5 is a block diagram of a receiver.

FIG. 1 is a diagram illustrating a model of a typical digital transmission system. It is shown together with an actual implementation of a cellular radio frequency (RF) communication system which is mapped to the model. The radio communication system comprises a base state BTS 2 and at least one mobile station MS 4 in communication with each other via a communication channel over an air interface. In the following description, the mobile station is considered to be the transmitter and the base transceiver station is considered to be the receiver. Reference numeral 6 denotes the transmission signal being conveyed by the mobile station 4 to the base transceiver station 2. It will readily be appreciated however that the system and techniques described in the following are equally applicable where the base transceiver station 2 is acting as the transmitter and a mobile station MS 4 is acting as the receiver.

For the purposes of the following description, the transmitter is considered to comprise a modulator which applies the necessary modulation to the signal so that it can be transmitted over the communication channel. The communication channel itself can be modelled as a channel impulse response h and a noise component w that may be typically introduced as a result of some external perturbation to the system. The receiver side is considered to comprise a demodulator which carries out the necessary demodulation functions so that the originally transmitted information can be recovered from the received signal. Thus, according to the model of FIG. 1 the modulator is considered as carrying out a modulation process and the demodulator is considered as carrying out a demodulation process. The assumption is made herein that it is necessary to apply a modulation to the signal prior to transmission, and thus to carry out an according demodulation process on receipt of the signal. In FIG. 1, X is used to denote the signal prior to modulation and y is used to denote the recovered received signal after demodulation.

For the purpose of the present description, the modulation and demodulation process can be thought of as introducing two components. These components are a DC offset ($a_{dc}$) and a phase shift vector (e) which may be modelled as shown in FIG. 2. That is, the received signal y differs from the channel-equalised version of the input signal x by $a_{dc}$ and e. The magnitude of the DC offset ($a_{dc}$) is unknown and causes problems with subsequent DSP techniques on the received signal if it is not removed. The phase shift vector (e) depends on the modulation method used, and thus is known. EDGE (Enhanced Data Rates for GSM Evolution) modulation is an example. For EDGE the selected modulation is 3 pi/8-8PSK. In the basic 8PSK constellation there are 8 equidistant points on the unit circle. This means that the transmitted symbols $x_k$ can have eight possible values, $x_k = e^{j*i*pi/4}$, where i can have values from 0 to 7 depending on the symbol value (j is complex indicator).

Now for 3 pi/8-8PSK, the 3*pi/8 shift means that the transmitted symbols are multiplied by a 3 pi/8 rotating value. So, $x_k' = x_k * e^{j*k*3*pi/8}$, where k is the symbol index.

This means that in the receiver the transmitted samples ($x_k'$) must be derotated by $e^{-j*k*3*pi/8}$ to get the original 8PSK constellation ($x_k$) to be equalised. This derotation will also make the DC offset rotate by $e^{-j*k*3*pi/8}$.

FIG. 3 illustrates a normal burst in a mobile communication system according to the GSM standard. This figure represents a burst received at a base station. For a TDMA system according to the GSM standard, mobile stations transmit bursts as modulated signals on respective carrier frequencies according to channels allocated to respective calls by a base station controller. One frequency channel may support up to eight calls, each call being associated with a respective burst, where each call is allocated a time slot in a TDMA frame in which to send the burst. Further details of a TDMA system according to the GSM standard are not described herein because they are known to a person skilled in the art. The normal burst contains two packets of 58 bits (DATA) surrounding a training sequence (TRS) of 26 bits. Three tail bits (TS) are added to each end of the normal burst. The training sequence (TRS) is a predetermined sequence of bits which are sent by the mobile station (MS) and is known at the base station controller (BSC). It is normally utilised at the base station controller to estimate the impulse response of the channel over which the burst is sent. According to the system described in the following, it is used to jointly calculate the impulse response and the DC offset. The actual information which is transmitted is located in the data bits (DATA) of the burst.

Thus, the technique described in the following is based on the joint estimation of the channel impulse response and DC offset using the training sequence TRS. X is used in the following to denote the training sequence because as far as the model of FIG. 1 is concerned, that is the input signal of interest for the following mathematical explanation. Before describing the system, an explanation of the mathematical techniques which are used in the system is set out.

The linear equation based on the models illustrated in FIGS. 1 and 2 is formally stated in Equation 1.

$$y = X \cdot h + e \cdot a_{dc} + w \quad \text{(Equation 1)}$$

Each digital sample of the signal is modulated prior to transmission and therefore experiences a phase shift depending on the modulation technique used. This phase shift is also known as rotation and may be represented as: $e^{-j\theta}$. Therefore a vector (e) may be formed which comprises the phase shifts of all the samples of the training sequence that are used as in Equation 2.

$$e = [e^{-j \cdot k \cdot \theta} \; e^{-j \cdot (k-1) \cdot \theta} \ldots e^{-j \cdot (k-n+1) \cdot \theta}]^T \quad \text{(Equation 2)}$$

where:
θ—represents the phase shift (and depends on the method of modulation that is implemented).
k—represents the time indexes (indices) of the samples taken of the training sequence.
n—represents the number of samples used in the training sequence.

For example, if GMSK modulation is used, the samples are all rotated by 90 degrees ($\theta = \pi/2$). Therefore, these samples will need to be derotated before the received signal is equalised.

Equation 4 can now be formulated by creating an extended training sequence matrix ($X_e$) and an extended impulse response vector ($h_e$) incorporating the phase shift vector (e) and the DC offset ($a_{dc}$) elements into the aforementioned matrix (X) and vector (h) as shown by Equation 3:

$$x_e = [\, X \;\; e \,] \text{ and } h_e = \begin{bmatrix} h \\ a_{dc} \end{bmatrix} \quad \text{(Equation 3)}$$

$$y = X_e \cdot h_e + w \quad \text{(Equation 4)}$$

FIG. 4a illustrates the original training sequence and extended training sequence matrices. FIG. 4b illustrates the original impulse response and the extended impulse response vectors, where:
m—represents the amount of impulse response taps (i.e. i=0 . . . 4)
n—represents the length of samples used for impulse response estimation (i.e. k=26).

FIG. 4a illustrates that the matrix size is determined by the number of columns and rows that constitute the matrix. It is important to note that the original training sequence matrix (X) is composed of known elements. The number of columns m corresponds to the number of discrete taps that the proposed model of the impulse response filter will possess. The number of rows n is determined by the length of samples used from the training sequence for impulse response estimation. This makes the matrix size and the computational power required by the DSP flexible depending on the user's specification. The extended training sequence matrix ($X_e$) is created by adding an additional column of elements to the known training sequence matrix (X) This additional column contains the elements of the phase shift vector (e) (also known) and the size of the extended training sequence matrix is now m+1 columns by n rows.

FIG. 4b shows the original and extended impulse response vectors ($h/h_e$). The extended impulse response vector has m+1 elements which means it can readily be manipulated with the m+1 columns provided by the extended training sequence matrix ($X_e$). The last element in the impulse response vector is the DC offset term ($a_{dc}$).

The extended impulse response vector $h_e$ can be found by ensuring that adequate estimates for the channel impulse response and DC offset can be made by minimising the function $F = |y - X \cdot h - e \cdot a_{dc}|^2$, where F represents the Least Squares solution to minimise the noise (w). Using the matrix format, Equation 5 results.

$$h_e = (X_e^H \cdot X_e)^{-1} \cdot X_e^H \cdot y \quad \text{(Equation 5)}$$

where; —y represents the received signal, and
$X_e^H$ represents the complex conjugate transpose of the extended matrix.

Thus, this has effectively solved for the required number of channel impulse response elements and also for the DC offset term ($a_{dc}$).

A block diagram for implementing the technique will now be illustrated in FIG. 5.

It should be understood that the various blocks in FIG. 5, although illustrated as separate interconnected entities, do not necessarily represent separate physical entities, but are intended to represent diagrammatically the various steps which are carried out. The blocks could be implemented as circuits or a suitably programmed microprocessor may effect each of the functions which is individually assigned to the blocks. Moreover, a receiver for a BTS or MS will have a number of components which are not illustrated in FIG. 5 and which have been omitted for the sake of clarity and because they do not pertain to the present invention. An antenna 12 receives the transmitted signal 10 via the air interface from the mobile stations. The antenna 12 is connected to RF circuitry 14. The RF circuitry 14 operates on the received burst to downshift the frequency to the baseband frequency and to sample the burst to provide from the analogue input signal digital sampled values. The output of RF circuitry 14 is denoted y and is a sampled burst comprising a plurality of signal samples $y_i$, sampled at the expected bit rate of the transmitted signal. As described above, FIG. 3 illustrates the burst construction. The output of the RF circuitry 14 is supplied along line 16 to a TRS extractor 18 and also to a subtraction circuit 40 the purpose of which will be described later.

The training sequence TRS is extracted from the received signal y and supplied along line 20 to an extended channel impulse response unit 22. It will be appreciated that TRS is represented at this point as k (k=26 in this embodiment) digital signal samples.

The extended channel impulse response unit 22 is used to calculate the so-called extended channel impulse response $h_e$ which includes not only the "normal" channel impulse response taps $h(i)_{i=0 \ldots 4}$, but also the required DC offset value $a_{dc}$. In known receivers, the channel impulse response unit uses the received training sequence TRS and calculates an estimated channel impulse response h by calculating the cross correlation between the received training sequence TRS and the known training sequence which is stored at the receiver, TRSref. In the present case, somewhat different calculations are performed according to the mathematical concepts described earlier. It will be appreciated that the extended CIR unit 22 comprises a suitably programmed processor for implementing the calculation. The extended channel impulse response unit 22 has access to a memory 34 in which there is prestored at least one so-called A matrix. The A matrix is calculated by manipulating the transpose of the complex conjugate of the extended training sequence matrix $X_e^H$ as defined in Equation 6. The formation of the extended training sequence matrix $X_e$ has been described and is illustrated in FIG. 4a.

$$A = (X_e^H \cdot X_e)^{-1} \cdot X_e^H \quad \text{(Equation 6)}$$

It will be readily understood that the diagrammatic layout of the memory 34 is for illustration purposes only and the use of the storage capacity can be in any appropriate manner. Moreover, a number of different A matrices can be precalculated and stored to take into account different phase shift vectors (e) and different training sequences. The extended CIR unit 22 can select the appropriate A matrix. The memory 34 also holds the phase shift vector (e) for a purpose which will be described later.

Therefore, the extended channel impulse response unit 22 has two inputs. One input is the training sequence TRS of the received signal and the other is the calculated A matrix. The extended CIR unit (22) calculates the extended channel impulse response vector $h_e$ using Equation 5 (noting the value of A in Equation 6). The matrix manipulations (based on the Least Squares minimisation of the noise function F) allow the impulse response h and DC offset $a_{dc}$ values to be solved by performing only one matrix multiplication, i.e. ($h_e = A \cdot y$).

A DC offset extract unit 26 extracts the DC offset $a_{dc}$ from $h_e$ and supplies it to a multiplier circuit (30). The other input to the multiplier circuit is the known phase shift vector e stored in a portion of memory. If the modulation method used resulted in no rotation of the samples, then this vector would comprise a set of ones. In either event, the phase shift vector (e) is multiplied with the DC offset ($a_{dc}$). The product $a_{dc} \cdot e$ is then subtracted from the received signal y at the subtraction circuit (40). The output is a corrected signal $y_c$ that is fed to an equaliser (48). The equaliser (48) also receives the normal channel impulse response h extracted from the extended channel impulse response vector $h_e$ by an extract h circuit (42). The equaliser is known in the art and allows the data DATA y in the burst to be recovered.

In brief, the equaliser, as the name suggests, is a filter used to negate the effects of the communication channel (such as time dispersion, fading, etc.). The calculation of the impulse response vector allows an equalising filter to be constructed modelled on the inverse of the impulse response taps calculated and reflected in the elements of the first m rows of the matrix shown in FIG. 4b.

Figure 6:
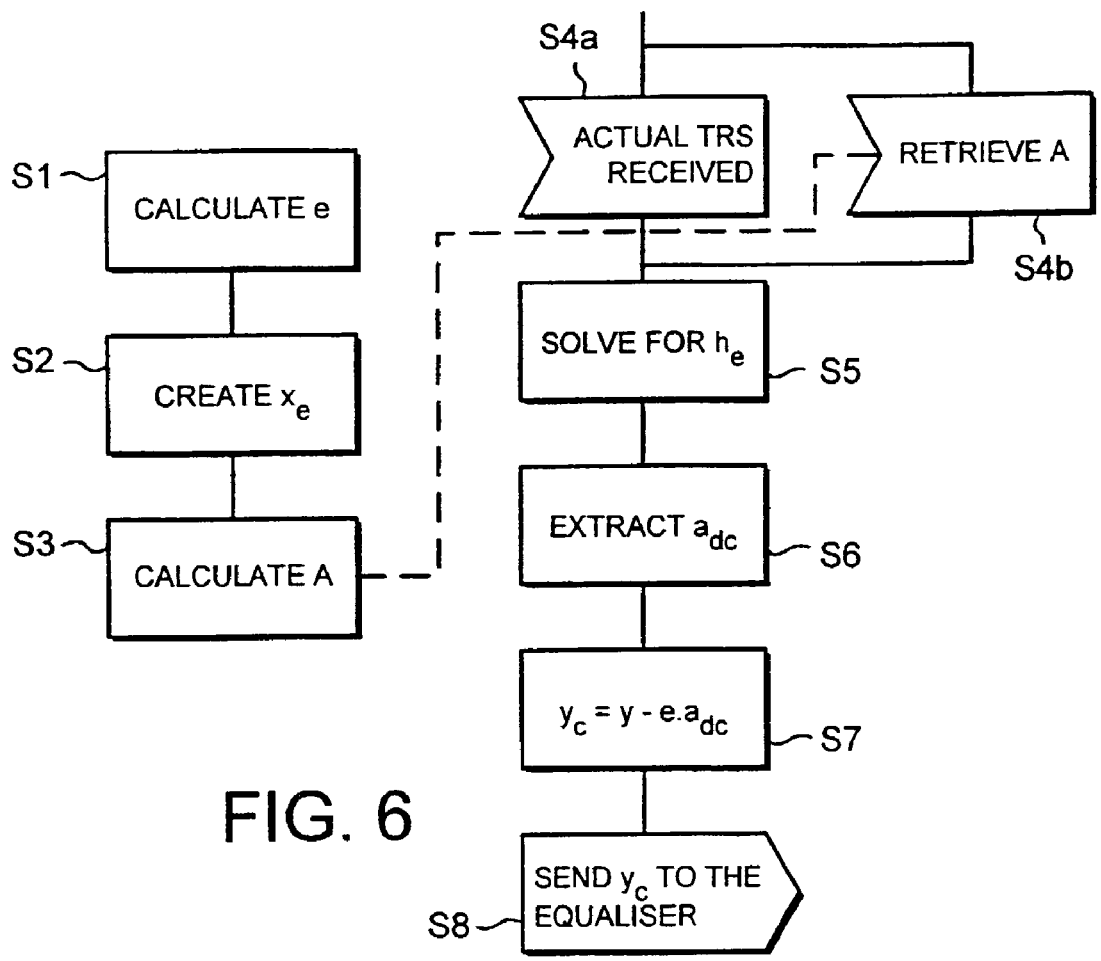
FIG. 6 is a flow diagram illustrating the method of the DC offset value removal.

FIG. 6 is a flow diagram which describes the processing sequence as two parts. The first part (S1 to S3) can be done prior to receipt of a signal as part of a set up procedure. The second part is accomplished in the circuitry of FIG. 5. The first step S1 is to calculate the phase shift vector (e), based on the known modulation technique. Next, at S2, the extended training sequence matrix ($X_e$) is created. It is assumed that the training sequence matrix X is already known. The phase shift vector is added as a final column of this matrix resulting in the extended matrix ($X_e = [X \ e]$).

The final processing operation S3 performed in the set up phase is to calculate the new matrix A given by Equation 6. In operation, the extended CIR unit 5 receives two input signals. The first input S4a is the training sequence portion TRS of the received signal. The second input S4b is the A matrix. The extended impulse response vector ($h_e$) may be calculated at S5 from Equation 5, and contains an additional element over the normal h taps, i.e. the DC offset ($a_{dc}$). Next at S6, the DC offset element $a_{dc}$ is extracted from the extended CIR vector $h_e$. Finally at step S7, Equation 7 is used to obtain the corrected signal that is sent to the equaliser circuit.

$$y_c = y - e \cdot a_{dc} \quad \text{(Equation 7)}$$

This takes into account whether the samples have been derotated or not. If there is no derotation the e vector is a vector of ones. The correct signal is sent (step S8) to the equaliser after removal of the corresponding DC offset components.

It should be noted that FIG. 1 and Equation 1 are defined as a model of the transmission system and therefore it is assumed that a noise component (w) will be present. However, Equation 5 is known as the LS (Least Squares) solution to a linear equation (i.e. Equation 1). This implies that the estimated parameters, h and $a_{dc}$ are chosen so that the energy of the noise term (w) is kept to a minimum.

Thus, while there have been shown and described and pointed out fundamental novel features of the present invention as applied to a preferred embodiment thereof, it will be understood that various omissions and substitutions and changes in the form and details of the devices described and illustrated, and in their operation, and of the methods described may be made by those skilled in the art without departing from the spirit of the present invention. For example, it is expressly intended that all combinations of those elements and/or method steps which perform substantially the same function in substantially the same way to achieve the same results are within the scope of the invention. Substitutions of elements from one described embodiment to another are also fully intended and contemplated. It is also to be understood that the drawings are not necessarily drawn to scale but that they are merely conceptual in nature. It is the intention, therefore, to be limited only as indicated by the scope of the claims appended hereto.

What is claimed is:

1. An apparatus comprising:
   a receiver configured to receive a signal transmitted via a communication channel, said received signal comprising digital data and training sequence bits modulated prior to transmission;
   a sampler configured to sample the received signal and to produce a plurality of received training signal samples (y) corresponding to the training sequence bits of the received signal, the received training signal samples possibly including a DC offset ($a_{dc}$);
   a processor configured to calculate a product of the received training signal samples (y) and a matrix A to provide an extended channel impulse vector ($h_e$) comprising m channel impulse elements (h) representing the communication channel and a further element representing the DC offset ($a_{dc}$), wherein the matrix A comprises a manipulation of an extended reference matrix ($X_e$) which has m+1 columns where m columns contain reference signal samples representing the training sequence bits and the m+1 column contains a set of rotation elements (e) dependent on the modulation applied to the digital data prior to transmission.

2. An apparatus according to claim 1, wherein the processor is configured to manipulate only the extended reference matrix to produce the matrix A.

3. An apparatus according to claim 2, wherein the extended reference matrix contains only the reference signal samples and the set of rotation elements.

4. An apparatus according to claim 1, wherein said processor is configured to minimize a function $F = |y - X \cdot h - e \cdot a_{dc}|^2$, where y represents the received training signal samples, X represents the reference signal samples and e represents the set of rotation elements.

5. An apparatus according to claim 1, wherein the sampler is further configured to sample the received signal and to produce a plurality of received data signal samples corresponding to the digital data of the received signal, the apparatus further comprising a summer configured to remove the DC offset from the received data signal samples.

6. An apparatus according to claim 5, comprising a combiner configured to combine the extracted DC offset with the set of rotation elements prior to removal of the DC offset from the received data signal samples.

7. An apparatus according to claim 1, wherein the processor is configured to generate an extended channel impulse vector $h_e$ as follows:

$$h_e = (X_e^H \cdot X_e)^{-1} \cdot X_e^H \cdot y$$

where $h_e$ represents the extended channel impulse vector, $X_e$ represents the extended reference matrix, y represents the received training signal samples and $X_e^H$ represents a complex conjugate transpose of the extended reference matrix.

8. An apparatus according to claim 1, comprising an equalizer configured to remove from the received signal, effects of the communication channel for the signal using the channel impulse elements.

9. An apparatus according to claim 1, wherein the signal comprises a transmission burst in a time division multiple access mobile communication system.

10. An apparatus according to claim 1, wherein the sampler is configured to sample the received signal at an expected transmitted bit rate of the signal to produce received signal samples corresponding to a number of bits of digital data and training sequence bits.

11. An apparatus according to claim 1, comprising a memory configured to store the extended reference matrix, wherein the processor is configured to read the extended reference matrix from the memory.

12. An apparatus according to claim 1, comprising a memory configured to store the matrix A, wherein the processor is configured to read the matrix A from the memory.

13. An apparatus according to claim 12, wherein the matrix A is provided by:

$$A = (X_e^H \cdot X_e)^{-1} \cdot X_e^H$$

where $X_e$ represents the extended reference matrix, and $X_e^H$ represents a complex conjugate transpose of the extended reference matrix.

14. An apparatus comprising:
   means for receiving a signal transmitted via a communication channel, said received signal comprising digital data and training sequence bits modulated prior to transmission;
   means for sampling the received signal to produce a plurality of received training signal samples (y), said received training signal samples (y) corresponding to the training sequence bits of the received signal, the received training signal samples possibly including a DC offset ($a_{dc}$);
   means for calculating a product of the received training signal samples (y) and a matrix A to provide an extended channel impulse vector ($h_e$) comprising m channel impulse elements (h) representing the communication channel and a further element representing the DC offset ($a_{dc}$), wherein the matrix A comprises a manipulation of an extended reference matrix ($X_e$) which has m+1 columns where m columns contain reference signal samples representing the training sequence bits and the m+1 column contains a set of rotation elements (e) dependent on the modulation applied to the digital data prior to transmission.

* * * * *